United States Patent [19]

Takatsugi

[11] Patent Number: 5,460,507
[45] Date of Patent: Oct. 24, 1995

[54] INJECTION UNIT FOR USE IN AN INJECTION MOLDING MACHINE

[75] Inventor: Satoshi Takatsugi, Oshino, Japan

[73] Assignee: Fanuc Limited, Minamitsuru, Japan

[21] Appl. No.: 150,044

[22] PCT Filed: Feb. 23, 1993

[86] PCT No.: PCT/JP93/00221

§ 371 Date: Nov. 17, 1993

§ 102(e) Date: Nov. 17, 1993

[87] PCT Pub. No.: WO93/18405

PCT Pub. Date: Sep. 30, 1993

[30] Foreign Application Priority Data

Mar. 24, 1992 [JP] Japan ..................... 495978

[51] Int. Cl.⁶ .................................. B29C 45/74
[52] U.S. Cl. ................... 425/550; 264/328.14
[58] Field of Search ................... 425/549, 550; 264/328.14

[56] References Cited

U.S. PATENT DOCUMENTS 3,697,204 10/1972 Kyritsis et al. ................. 425/550

FOREIGN PATENT DOCUMENTS 63-37229 10/1988 Japan .
3-104616 5/1991 Japan .
1599276 9/1981 United Kingdom .
2167339 5/1986 United Kingdom ......... 425/550

OTHER PUBLICATIONS

Patent Abstracts of Japan, vol. 14, No. 224 (M–972) (4167) 11 May 1990 & JP-A-02 055 116 (Nissei Plastics Ind Co) 23 Feb. 1990.

Patent Abstracts of Japan, vol. 13, No. 311 (M–851) (3659) 17 Jul. 1989 & JP-A-01 099 825 (Fanuc Ltd.) 18 Apr. 1989.

*Primary Examiner*—Tim Heitbrink
*Attorney, Agent, or Firm*—Staas & Halsey

[57] ABSTRACT

The present invention provides an injection unit having a structure designed for easier machining of a resin guiding hole located in a front plate constituting the injection unit in tile injection molding machine, as well as for reducing tile thermal influence of the heating cylinder and tile plate body on the resin guiding hole. The front plate of the injection unit has a nose member (5), in which a hopper (6) and the heating cylinder (7) are attached, and the plate body (4) linked to a tie bar (10), which are components separated from each other. The injection unit is constructed by joining the heating cylinder (7), the nose member (5) and the plate body (4) to one another through air gaps (23, 24, 28, 29) formed between these components.

7 Claims, 2 Drawing Sheets

INJECTION UNIT FOR USE IN AN INJECTION MOLDING MACHINE

TECHNICAL FIELD

The present invention relates to an improvement of an injection unit in an injection molding machine.

BACKGROUND ART

In general, an injection unit in an injection molding machine includes a front plate 1, a moving plate 2 and a rear plate 3, in this order from the front, opposite to a clamping unit (not shown), as illustrated in FIG. 2. The front plate 1 includes a nose member 5 projecting from a plate body 4 toward the front. A hopper 6 and a heating cylinder 7 are attached to the nose member 5. Further, a resin guiding hole 9, which penetrates into the heating cylinder 7 from the hopper 6 and reaches to a screw 8, is formed in the nose member 5. In FIG. 2, reference numeral 10 denotes a tie bar linking the front plate 1 to the rear plate 3. The moving plate 2 in which the screw 8 is attached to its front is slidably fitted to the tie bar 10 in the front and rear direction. A ball screw 11 is pivotally attached to the rear plate 3, and its front portion is screwed into a ball nut 12 which is fixed to the rear side of the moving plate 2. A pulley 14, which is connected in association with a servo motor (not shown) for injection, is fixed to the backward projecting end of the rear plate 3 to which the ball screw 11 is attached. When the pulley 14 is rotated by the servo motor for injection, the ball screw 11 is rotated, and the ball nut 12 or the moving plate 2 is moved forward for injecting operation.

In order to make a resin flow smooth, it is necessary to grind the resin guiding hole 9, which is formed in the nose member 5 of the front plate 1, a constituent of an injection unit. Further, in order to prevent an inner wall of the resin guiding hole from being corroded due to effects of water and a corrosive gas caused by a resin, the inner wall portion may be provided with corrosion-resistant plating or a lining with a thin stainless tube fit into the hole. Conventionally, however, it has been customary to integrally form the front member 5 with the front body 4 of the front plate 1 as shown in FIG. 2, and thus it has been cumbersome and time-consuming to machine the resin guiding hole in the nose member 5, since such machining operation involves handling the whole front plate having a complex shape and large weight.

Further, the resin is melted with the rotational operation of the screw 8 in the heating cylinder 7, which is kept heated at a high temperature with a heater. On the other hand, the nose member 5 of the front plate 1 is cooled lest a bridge is formed in the resin guiding hole due to the heated resin supplied from the hopper 6, or preheating is required depending on the characteristic of resin. For this reason, it is necessary to suitably control the temperature of the nose member so that a predetermined temperature can be maintained. However, being integrally formed with the plate body 4 of the front plate 1, and having a small heat capacity, the nose member 5 is apt to be thermally influenced by the plate body 4, and so it has been difficult to control its temperature at a constant level either in cooling or heating. In addition, the conventional heating cylinder has been directly and closely attached to the nose member 5, and so it is apt to be affected by the temperature of the heating cylinder 7.

DISCLOSURE OF THE INVENTION

An object of the present invention is to provide an injection unit having a structure designed for easier machining of the nose member of the front plate, as well as reducing the thermal influence of the heating cylinder and the plate body on the nose member.

To achieve the above object, the present invention provides an injection unit in an injection molding machine, comprising a front plate which joins a plate body to a nose member which is a component separated from the plate body. The plate body has a through hole in the middle thereof for allowing a base of a heating cylinder to be inserted to be linked to a rear plate through a tie bar. The nose member has a through hole for inserting the base of the heating cylinder in the middle thereof, and a resin guiding hole which penetrates into the through hole from outside. The aforesaid injection unit is constructed so that air gaps are formed between the nose member and each of the faces of other components, which are opposite to each other in combining components such as the nose member, plate body and heating cylinder. Preferably, the aforesaid injection unit is constructed so that an air gap having a predetermined width and depth is formed between an inner surface of the through hole of the nose member and an outer surface of the heating cylinder.

More preferably, a passage through which temperature controlled fluid flows is formed in the nose member which is one of components constituting the front plate.

Furthermore preferably, an air gap having a predetermined width and depth is formed between plane of the plate body and each of the planes of the nose member combined with the plate body, which are opposite to each other. In addition, an air gap having a predetermined width and depth is formed between the inner surface of the through hole of the plate body and the outer surface of the heating cylinder inserted into the through hole.

Still more preferably, an air gap having a predetermined width and depth is formed between plane of a flange connected to the heating cylinder and the planes of nose member installed in the plate body, which are opposite to each other.

As described above, according to the present invention, the nose member of the front plate constituting an injection unit is formed as a component separated from the plate body for easier machining and handling of the nose member.

BEST MODE FOR CARRYING OUT THE INVENTION

Figure 1:
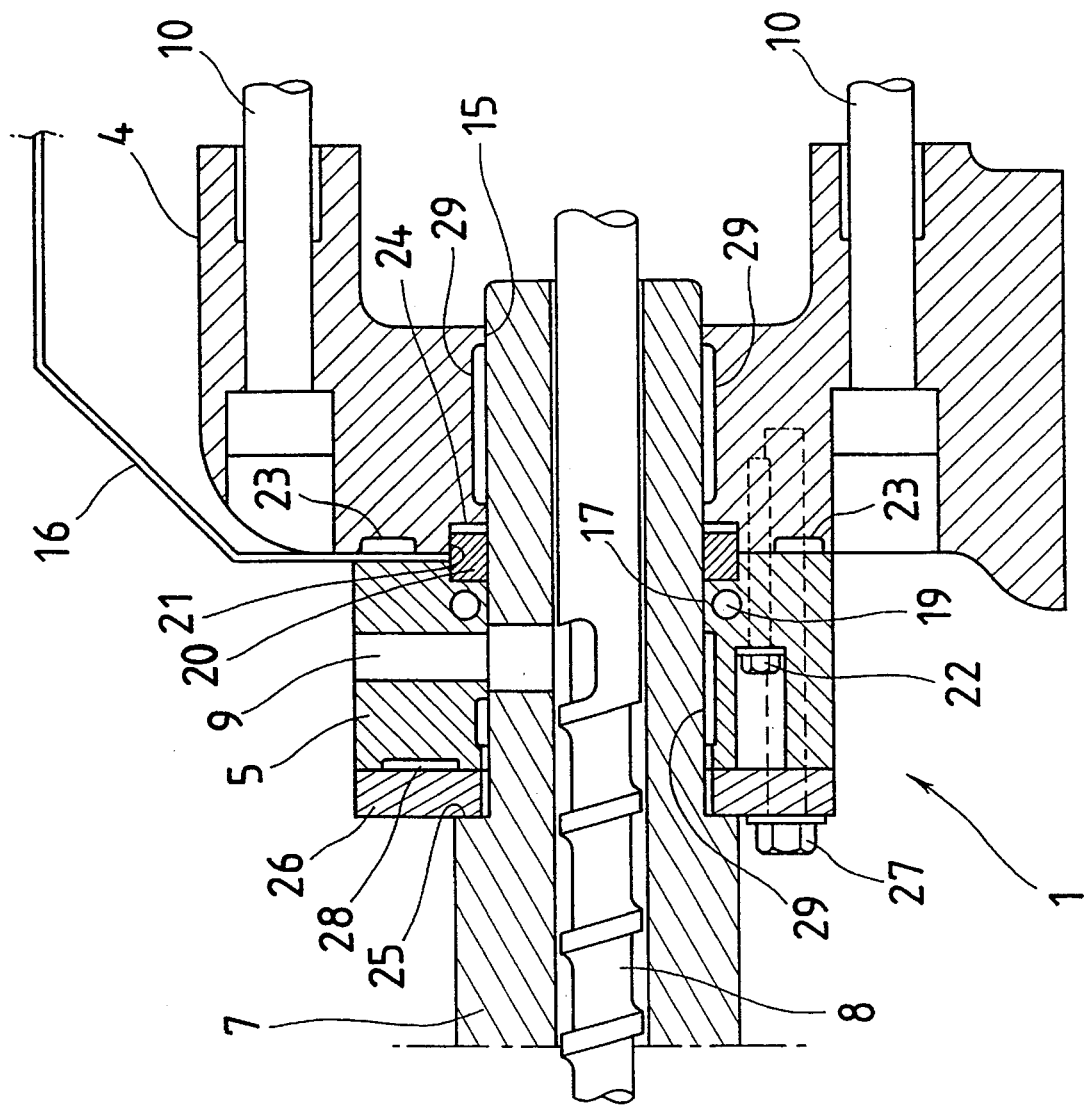
FIG. 1 is a cross sectional view illustrating a portion of a front plate according to the present invention.
Figure 2:
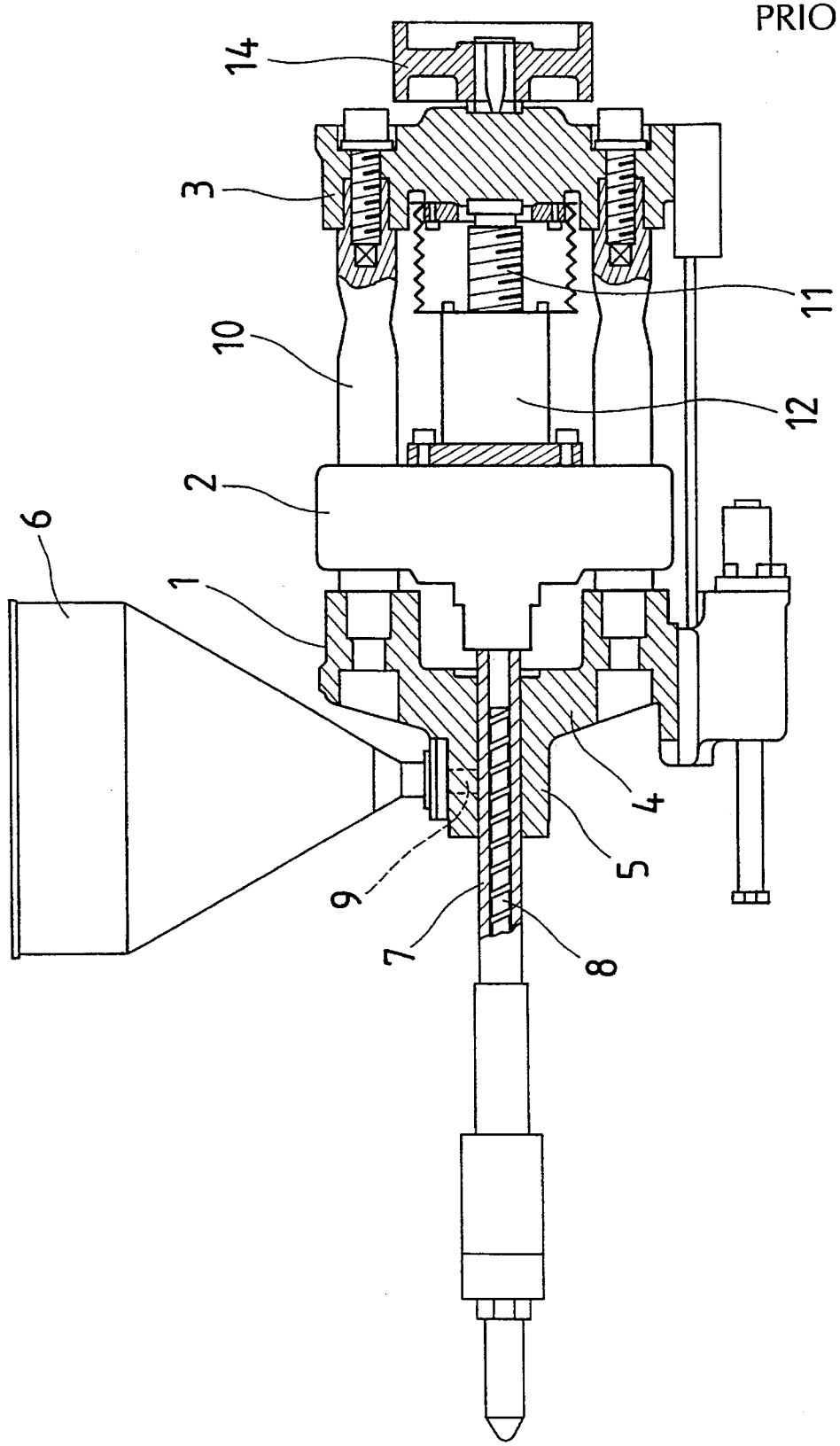
FIG. 2 is a cross sectional view illustrating part of the conventional injection unit.

FIG. 1 shows portions of a front plate 1 and a heating cylinder 7 which constitute an injection unit in an injection molding machine. The front plate 1 comprises a plate body 4 and a nose member 5, which are separate components, as described later. A heating cylinder 7 is attached to the front plate 1, in which the plate body 4 and the nose member 5 are combined.

The plate body 4 has a through hole 15 for allowing a base of the heating cylinder 7 in the middle of the plate body to pass therethough, and is joined to a rear plate (not shown)

through a tie bar 10. Incidentally, a reference numeral 16 denotes a cover.

The nose member 5 has a through hole 17 for allowing the base of the heating cylinder 7 in the middle thereof to pass therethrough, as well as a resin guiding hole 9 penetrating from the outside into the through hole 17 in the radial direction. Further, a passage 19, through which a temperature-controlled fluid flows, is formed in the interior of the nose member 5.

The base of the heating cylinder 7 passes through the through hole 17 of the nose member 5, and is then fitted into the through hole 15 formed in the plate body 4. An injection screw 8 is inserted into the interior of the heating cylinder 7.

An annular locating ring 20 for centering is screwed on the concave member which is formed in the periphery of the through hole 17 on the back of the nose member 5. Further, the locating ring 20, which is screwed on the nose member 5, is fitted into an annular locating groove 21 which is formed on the periphery of the through hole 15 on the front side of the plate body 4. On this condition, a bolt 22, which has the length ranging from the front side of the nose member 5 to the plate body 4, is screwed into the plate body 4, thereby causing nose member 5 to be fixed to the plate body 4.

In this case, the back side of the nose member 5 and the front side of the plate body 4 directly face each other except portions of the locating ring 20 and the locating groove 21; however, an air gap 23 is formed between planes facing each other or between the back side of the nose member 5 and the front side of the plate body 4, as shown in FIG. 1. To form such an air gap, a groove having a predetermined width and depth may be formed only on the side of plate body 4 or only on the side of nose member 5, or on both sides. Further, an air gap 24 having a predetermined width and depth is formed between the front side of the locating ring fixed on the nose member 5 and the bottom of the locating groove of the plate body 4. A flange 26 is fixed on the heating cylinder 7.

As described above, with the nose member 5 fixed on the plate body 4, the base of the heating cylinder 7, on which the flange 26 is fixed, is inserted through the through hole 15 of the plate body and the through hole 17 of the nose member 5, thereby causing the back side of the flange 26 to be abutted against the front side of the nose member 5. Then, a bolt 27 is inserted into the plate body 4 from the front side of the flange 26 through the nose member 5. A female screw thread for receiving the bolt 27 is previously formed in the plate body 4. The flange 26 abuts the heating cylinder at a surface 25.

In this case, an air gap 28 is formed between the back side of the flange 26 and the front side of the nose member 5. In an example illustrated in FIG. 1, the air gap 28 is formed by providing a groove of predetermined width and depth in the front side of the nose member 5.

Air gaps 29 are also formed not only between the inner periphery of the through hole 17 of the nose member 5 and the outer periphery of the heating cylinder 7 opposite to the nose member, but also between the inner periphery of the through hole 15 of the plate body 4 and the outer periphery of the heating cylinder 7 opposite to the plate body. These air gaps 29 are defined by forming grooves of a predetermined width and depth, in the through hole 15 of the plate body and the through hole 17 of the nose member 5, in an example illustrated in FIG. 1.

The injection unit is constructed as described above. The resin guiding hole 9 formed in the nose member 5 undergoes a predetermined machining before the nose member 5 is fixed on the plate body 4. Various machining operations of whatever necessary such as grinding, plating or lining are executed. Depending on circumstances, even if the nose member 5 has been installed once in the plate body 4, the nose member 5 can be detached from the plate body 4 for undergoing necessary machining, and reinstalled in the plate body 4.

During injection molding, the heating cylinder 7 is heated, and the temperature controlled fluid circulates through the passage 19 of the nose member 5. As described above, however, the air gaps 23, 24, 28 and 29 are formed between the plate body 4 and the nose member 5, between the flange 26 fixed on tile heating cylinder 7 and the nose member 5, between the heating cylinder 7 and the plate body 4, and between the heating cylinder 7 and nose member 5, respectively, so that only small thermal conductance occurs among these components.

I claim:

1. An injection unit in an injection molding machine, comprising:

a front plate combining a plate body with a nose member which is a component separated from said plate body;

said plate body having a through hole in the middle thereof for allowing a base of a heating cylinder to be inserted therethrough, wherein the plate body is linked to a rear plate by a tie bar;

a locating member being positioned on said heating cylinder, retained between said nose member and said plate body, for locating said heating cylinder at a predetermined position relative to said front plate;

said nose member having a through hole in the middle thereof for allowing the base of the heating cylinder to be inserted therethrough, as well as a resin guiding hole which penetrates into said through hole in the radial direction;

said injection unit being constructed so that air gaps are formed between said nose member and opposite face of each of said nose member, said plate body and said heating cylinder.

2. An injection unit in an injection molding machine, comprising:

a front plate combining a plate body with a nose member which is a component separated from said plate body;

said plate body having a through hole in the middle thereof for allowing a base of a heating cylinder to be inserted therethrough wherein the plate body is linked to a rear plate through a tie bar;

said nose member having a through hole for inserting the base of the heating cylinder in the middle thereof, as well as a resin guiding hole which penetrates into said through hole in a radial direction;

said injection unit being constructed so that an air gap having a predetermined width and depth is formed between an inner surface of the through hole of said nose member and an outer surface of said heating cylinder.

3. An injection unit in an injection molding machine according to claim 1 or 2, wherein a passage, through which temperature controlled fluid flows, is formed in said front plate nose member.

4. An injection unit in an injection molding machine according to claim 1 or 2, wherein an air gap having a predetermined width and depth is formed between a planar surface of said plate body and planar surfaces of said nose member combined with the plate body, which are opposite 5. An injection unit in an injection molding machine according to claim 1 or 2, wherein an air gap having a predetermined width and depth is formed between an inner surface of said through hole of said plate body and an outer surface of said heating cylinder after said heating cylinder has been inserted into said through hole.

6. An injection unit in an injection molding machine according to claim 1 or 2, wherein an air gap having a predetermined width and depth is formed between a planar surface of a flange connected to said heating cylinder and each opposing planar surface of said nose member installed in said plate body.

7. An injection unit in an injection molding machine according to claim 1, wherein the locating member is a locating ring.

* * * * *

UNITED STATES PATENT AND TRADEMARK OFFICE
CERTIFICATE OF CORRECTION

PATENT NO.   : 5,460,507
DATED        : October 24, 1995
INVENTOR(S)  : Takatsugi It is certified that error appears in the above-indentified patent and that said Letters Patent is hereby corrected as shown below:

On the title page item [75], change "Oshino" to --Minamitsuru--;
    item [30] change "495978" to --95978--.

Signed and Sealed this

Twenty-third Day of January, 1996

Attest:

BRUCE LEHMAN

*Attesting Officer*      *Commissioner of Patents and Trademarks*